(12) United States Patent
Kemper

(10) Patent No.: US 9,687,767 B2
(45) Date of Patent: Jun. 27, 2017

(54) FILTER APPARATUS FOR EXTRACTING FINE DUST FROM AIR

(71) Applicant: Gerhard Kemper, Vreden (DE)

(72) Inventor: Gerhard Kemper, Vreden (DE)

( * ) Notice: Subject to any disclaimer, the term of this patent is extended or adjusted under 35 U.S.C. 154(b) by 0 days.

(21) Appl. No.: 14/785,561

(22) PCT Filed: Jul. 10, 2014

(86) PCT No.: PCT/EP2014/001896
§ 371 (c)(1),
(2) Date: Oct. 19, 2015

(87) PCT Pub. No.: WO2015/007376
PCT Pub. Date: Jan. 22, 2015

(65) Prior Publication Data
US 2016/0114279 A1    Apr. 28, 2016

(30) Foreign Application Priority Data

Jul. 13, 2013 (DE) .................. 10 2013 011 758

(51) Int. Cl.
*B01D 46/00* (2006.01)
*B01D 45/12* (2006.01)
(Continued)

(52) U.S. Cl.
CPC ......... *B01D 46/0068* (2013.01); *B01D 45/12* (2013.01); *B01D 46/2411* (2013.01); *B01D 50/002* (2013.01); *B01D 46/521* (2013.01)

(58) Field of Classification Search
CPC ........ B01D 46/0067–46/0071; B01D 46/2411; B01D 46/00; B01D 46/24; B01D 46/12; B01D 46/521; B01D 50/00; B01D 50/002
(Continued)

(56) References Cited

U.S. PATENT DOCUMENTS 5,221,299 A * 6/1993 Boring .................. B01D 45/12
                                                    55/459.1
5,525,396 A * 6/1996 Rudolph ................ A47L 9/102
                                                    428/131
(Continued)

FOREIGN PATENT DOCUMENTS

DE         19753070 A      6/1999
WO         83/03556 A     10/1983

*Primary Examiner* — T. Bennett McKenzie
(74) *Attorney, Agent, or Firm* — Andrew Wilford

(57) ABSTRACT

The invention relates to a device for extracting and filtering air laden with fine dust, having at least one filter cartridge which is arranged in a filter chamber and which has an in particular cylindrical, vertical filter wall surrounding an internal cartridge hollow chamber, which filter wall is impinged on by the laden air from the outside such that the fine dust is deposited on the outer surface of the filter wall, and having compressed-air nozzles which are arranged in the cartridge hollow chamber and by means of which the deposited fine dust is blown off the filter wall outer surface, such that the blown-off fine dust passes downward into at least one fine-dust collecting chamber in order to be removed from there, wherein there is connected to the fine-dust collecting chamber a dust line which serves for the discharge of the fine dust and which leads to a fine-dust separator by means of which the fine dust is removed from the air, and wherein a return line leads from the fine dust separator to the fine-dust collecting chamber or to the untreated-air side of the filter chamber, through which return line the air that has had the fine dust substantially removed from it passes back, in a circuit, to the fine-dust collecting chamber or to the untreated-air side of the filter chamber.

14 Claims, 3 Drawing Sheets

(51) Int. Cl.
*B01D 46/24* (2006.01)
*B01D 50/00* (2006.01)
*B01D 46/52* (2006.01)

(58) Field of Classification Search
USPC .............................................. 55/302; 96/417
See application file for complete search history.

(56) References Cited

U.S. PATENT DOCUMENTS

| | | | |
|---|---|---|---|
| 7,390,339 B1* | 6/2008 | Warrick | B01D 45/12 55/346 |
| 2005/0160707 A1* | 7/2005 | Dries | B01D 46/002 55/418 |
| 2006/0144025 A1* | 7/2006 | Vallayer | B01D 45/12 55/428 |
| 2009/0277325 A1 | 11/2009 | Gottung | |
| 2010/0126350 A1* | 5/2010 | Sharma | B01D 29/904 95/268 |
| 2014/0076160 A1* | 3/2014 | Reid | B01D 46/0068 95/280 |

* cited by examiner

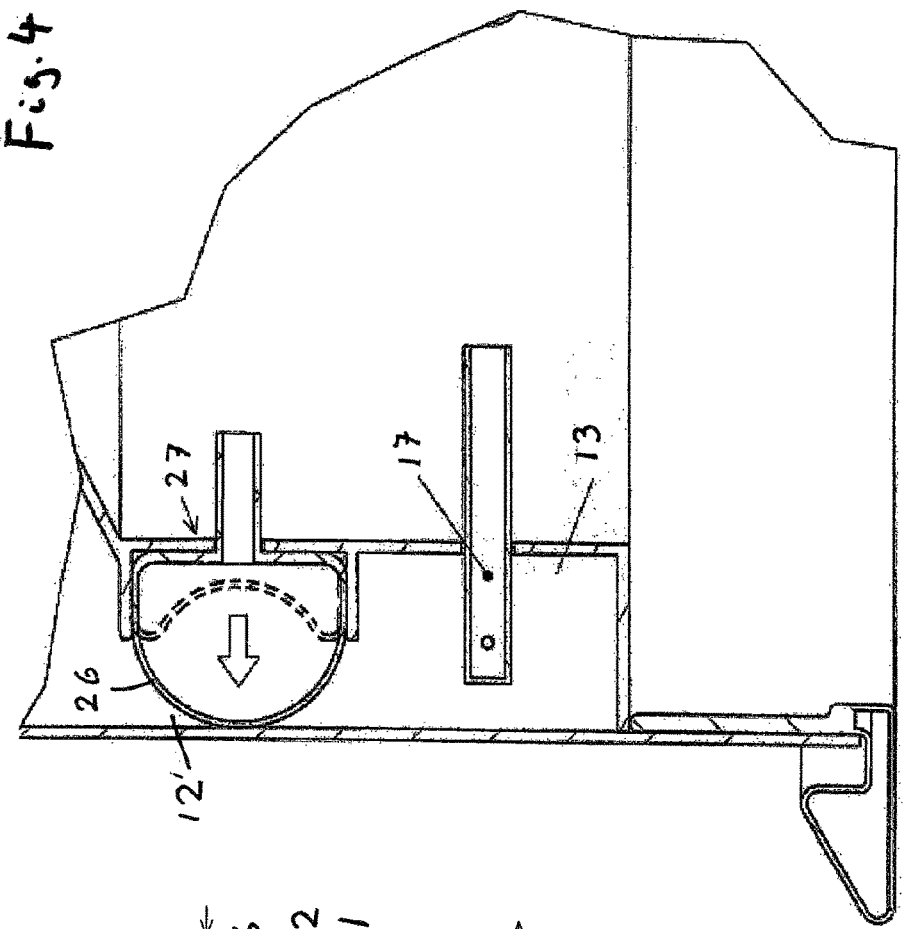
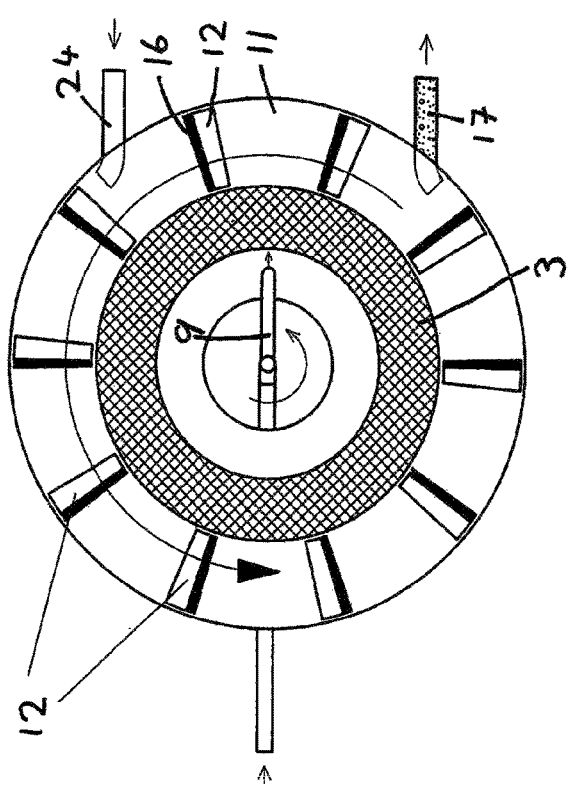

FILTER APPARATUS FOR EXTRACTING FINE DUST FROM AIR

CROSS REFERENCE TO RELATED APPLICATIONS

This application is the US-national stage of PCT application PCT/EP2014/001896 filed 210 July 2014 and claiming the priority of German patent application 102013011758.5 itself filed 13 Jul. 2013.

FIELD OF THE INVENTION

The invention relates to an apparatus for filtering fine particulates from air, having at least one filter cartridge in a filter chamber, a vertical filter wall that defines an in particular cylindrical inner cartridge compartment and against which particulate-laden air is blown from outside so that the particulates accumulate on the outer surface of the filter wall, and compressed air nozzles in the cartridge compartment that blow the accumulated particulates out and off the filter wall outer surface so that the blown-off particulates move downward into at least one particulates-collection chamber, whence they are removed.

BACKGROUND OF THE INVENTION

In known extraction apparatuses of this type, when the filter cartridge(s) is/are cleaned off, the particulates move into the particulates-collection chamber that is formed by a bag or sack and is removably fastened below the filter cartridge(s) on the lower side of the apparatus. During removal and closing of the filled bag/sack, it is unavoidable that on the one hand small quantities of particulates will escape that contaminate the surroundings and on the other hand endanger the health of the operator.

OBJECT OF THE INVENTION

The object of the invention is to improve an apparatus of the type described above so that, with simpler, more easily handled, space-saving, and mobile construction, secure disposal of the particulates is provided, without quantities of particulates being able to escape to the outside. It is also the object of the invention to achieve secure internal disposal of the particulates within the apparatus.

SUMMARY OF THE INVENTION

These objects are achieved according to the invention in that
- a particulates conduit for transporting the particulates away is connected to the particulates-collection chamber and extends to a separator that frees the air of the particulates, and
- a return line extends from the separator to the particulates-collection chamber or to the unfiltered air side of the filter chamber such that air essentially freed of the particulates returns in the circuit to the particulates-collection chamber or to the unfiltered air side of the filter chamber.

In this way, an extraction and filtration apparatus for particulates is provided that securely disposes of particulates, without permitting them to escape. This is done with small external dimensions, simpler handling, and a construction having greater mobility.

It is advantageous in particular in this case if the particulates container, in particular the cartridge, is connected to the separator via a closure system that, after removal of the particulates container/the cartridge from the separator, automatically closes the intake port of the particulates container.

It is preferably proposed that the particulate-laden air is set into rotation above the filter cartridge by a tangential supply and/or by a swirl generator having an inclined wing, so that the particulate-laden air circulates externally in a spiral around the filter cartridge.

The conveyance of the particulates from the annular outer compartment enclosing the filter cartridge into the particulates-collection chamber is improved if in particular radially arranged slots are arranged as particulate traps in the floor of the annular outer compartment enclosing the filter cartridge, through which the particulates move into the particulates-collection chamber arranged underneath. In this case, the slots acting as particulate traps have inclined incident flow surfaces.

Secure emptying of the particulates-collection chamber is achieved if blowing nozzles open in an inclined, in particular tangential manner into the annular particulates-collection chamber, such that the air contained in the particulates-collection chamber is swirled up together with the particulates collected therein by the air injected by the blowing nozzles, to be transported away through the particulates conduit. This ensures that the opening(s) are closable.

Advantageously, the filter has a housing or frame that in particular is portable, and inside which the filter cartridge(s), the particulates-collection chamber, and a fan that draws in the particle-laden air are arranged one above the other. In this case, the separator and the particulates container are fastened on the rear of the housing, in particular in the form of a replaceable cartridge, so that an easily handled mobile appliance of small external dimensions is provided. Wheels for movement can be fastened on the lower side of the apparatus in this case.

The above-mentioned features and advantages are provided in particular in an appliance having lower power. The apparatus/appliance preferably has a throughput of particulate-laden air of at most 5000 $m^3$/hour, preferably of at most 2000 $m^3$/hour.

BRIEF DESCRIPTION OF THE DRAWING

Embodiments of the invention are schematically illustrated in the drawings and will be described in greater detail hereafter. In the figures:

FIG. 2 is a horizontal section along A-A in FIG. 1, FIG. 4 shows an enlarged illustration of the particulates-collection chamber having a closable opening.

SPECIFIC DESCRIPTION OF THE INVENTION

Figure 1:
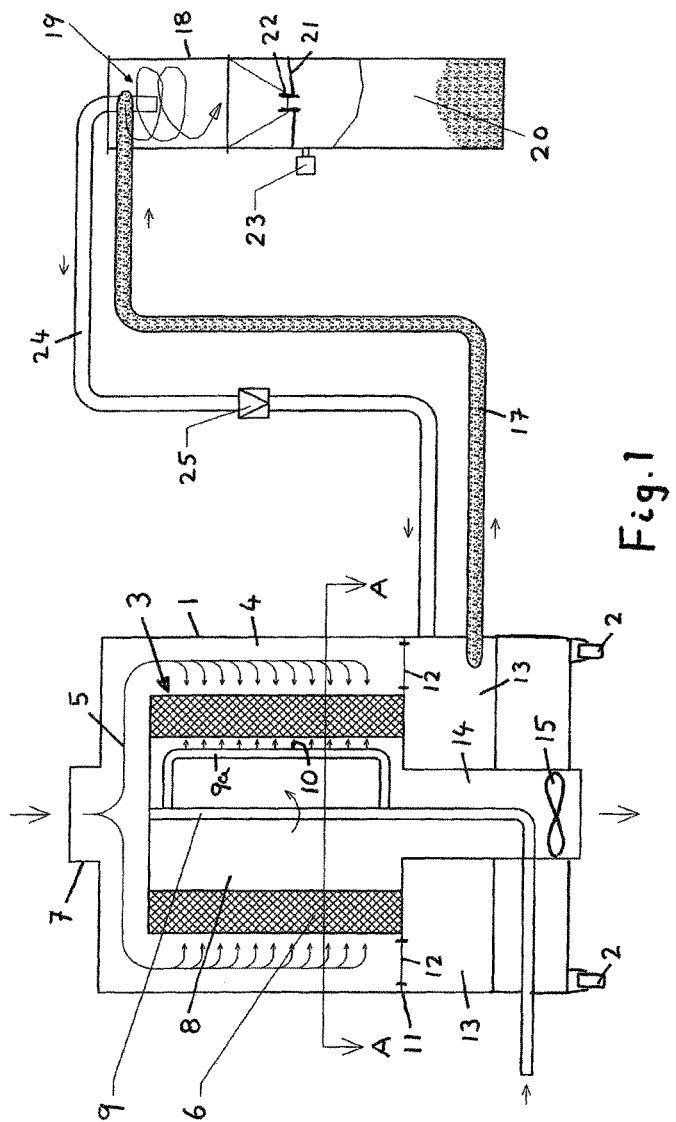
FIG. 1 shows a first embodiment having a filter cartridge, a particulates-collection chamber, and fan, one above the other in a housing or frame and a particulates separator having a detachable receiving container fastened on the rear of the housing.

The apparatus or appliance for filtering particulates from air is preferably a portable unit having a housing 1 or frame having three to four wheels 2 on its lower side. The housing encloses at least one filter cartridge 3 having a cylindrical vertical filter wall 6 made of folded filter material. An annular outer compartment 4 between the housing wall and the filter wall 6 is supplied with air laden with particulates that is suctioned in at the upper side of the housing and then inward through the filter wall 6 into a cylindrical inner compartment 8 of the filter cartridge that is closed on its upper side. Thus the particulates accumulate on the outer surface of the filter cartridge.

Before the particle-carrying air 5 moves into the housing interior, it flows through a rotation generator (not shown) at the upper air intake 7 that causes the air to circulate around the outside of the filter cartridge in a spiral.

A U-shaped tube 9 that emits compressed air is rotatable in the inner compartment 8 of the filter cartridge 3 about an axis on which the filter cartridge is centered, and this tube has a section 9a that is parallel to the axis, close to the filter cartridge inner surface, and that has a row of outlet holes arranged one above the other, in particular nozzles 10, on its outer side facing radially outward. As it circles the tube section 9a, the compressed air exiting from the nozzles penetrates the filter wall from the inside to the outside and in this case detaches the particulates that have accumulated on the outer surface of the filter wall 6, in particular in the folds thereof.

The particulates detached in this way from the filter outer wall move downward to a floor 11 of the annular outer compartment 4 and pass through radially extending slots 12 of the floor 11 into a particulates-collection chamber 13 that is located under the floor and that annularly surrounds a central vertical duct 14 that extends downward from the cartridge inner compartment 8 to a fan 15 below the particulates-collection chamber. The fan suctions the air 5 through the filter cartridge 3 and blows it in filtered form out into the space in which the filter apparatus is located.

The slots 12 in the floor 11 each have an angled incident flow surface 16 on the radial slot edge, and the slots form particulate traps that capture the particulates circulating around the filter cartridge 3 and guided them into the particulates-collection chamber 13.

A particulates conduit 17 transports the particulates collected in the particulates-collection chamber to a separator 18 and is connected close to the bottom wall of the particulates-collection chamber 13. The separator is a cyclone into which large quantities of contained transported air are introduced through the particulates conduit 17 at the top of the separator and are swirled into a cyclone 19 in the separator such particulates separate outward from the air and move downward into a particulates container 20 and collect therein.

The particulates container 20 is removably fastened on the separator 18 and is disposed of after complete filling, in particular burned in a waste incineration plant. For this purpose, the particulates container preferably consists of a cartridge made of combustible material, in of cardboard. To ensure that no particulates escapes outward during the replacement and therefore during removal of the particulates container 20, the particulates container is closed on its upper side by a film or membrane 21 that is penetrated by a central tube 22 on the lower side of the separator. In this case, the opening in the film/membrane 21 is elastic and/or is designed such that after the removal of the particulates container, the opening closes automatically and contamination is prevented.

The floor of the particulates-collection chamber forms a funnel that opens into the particulates discharge tube 22. A fill level sensor 23 on the rear of the filter apparatus, is carried on the outside of the particulates container 20.

The upstream end of an air return line 24 opens into the center of the cyclone 19 and returns air from the center of the cyclone that is less laden with particulates to the particulates-collection chamber 13. The particulates conduit 17 therefore forms, together with the return line 24, an air circuit for the transport of the particulates from the particulates-collection chamber 13 to the separator 18. Circulation is effected by an air-flow booster 25 that preferably has a Venturi nozzle having a compressed air fitting. The particulates conduit 17 can alternatively or additionally also have a blower.

The separator 18 is preferably mounted with the particulates container 20, in particular in the form of a cartridge, on the rear of the filter apparatus, in particular externally, so that the separator is a fixed component of the movable appliance and the particulates container is easily accessed in particular as a cartridge.

Figure 3:
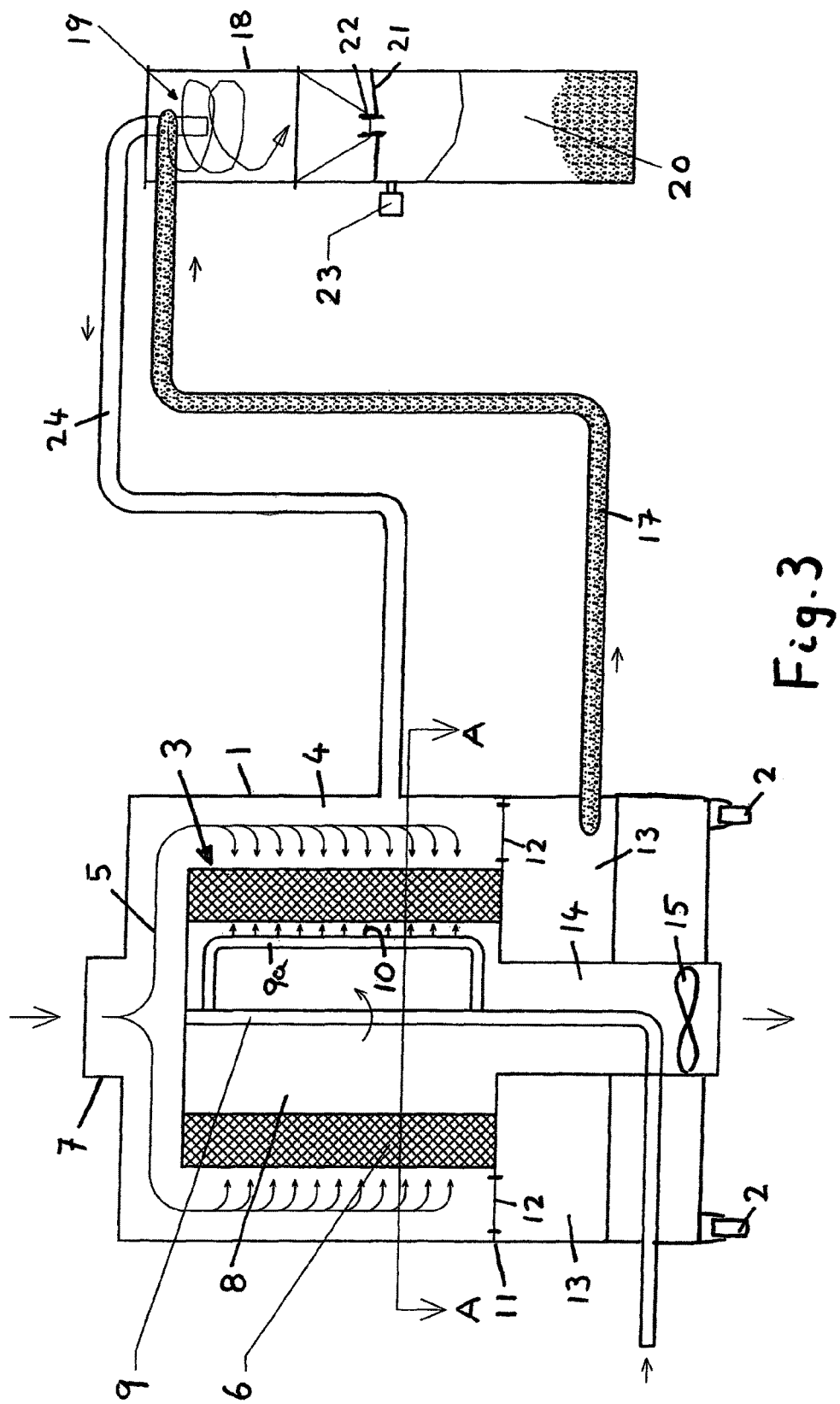
FIG. 3 shows a second embodiment with secure emptying of the particulates-collection chamber.

Another embodiment of the invention is shown in FIGS. 3 and 4 that differs from the embodiment of FIGS. 1 and 2 in that the return line 24 coming from the separator 18 does not open into the particulates-collection chamber 13, but rather into the annular outer compartment 4 that surrounds the filter cartridge 3 and forms the unfiltered air side. In this case, the particulates-collection chamber 13 is embodied as follows:

The opening or slots 12 are formed as radially oriented particulates traps as in the first embodiment. In the second embodiment according to FIGS. 3 and 4, these slots can also be radial, but there is preferably an annular opening 12 that is coaxial to the filter cartridge axis but closable. Greatly varying constructions can be selected to effect this closing. In the embodiment shown in FIG. 4, the opening 12 is closable by an inflatable hose seal 27 having a section of hose 26 or a membrane that is acted on by air pressure to swell and close the opening 12. Both the closed position and also the open position are shown in FIG. 4.

Furthermore, compressed air nozzles or blowing nozzles (not shown) are located in the annular particulates-collection chamber 13 that open diagonally, in particular tangentially, into the annular chamber 13 and in this case, on the one hand, swirl up the particulates collected in the chamber 13 and, on the other hand, set the particulates into a rotating movement along the annular chamber. The particulates swirled up in this manner are transported almost completely through the particulates conduit 17 to the separator 18.

In this construction, it is significant that due to the injection of air into the ring chamber 13 with closed opening(s) 12, the air carrying the particulates moves through the particulates conduit 17 and simultaneously the cleaned air is also transported back through the return line 24 into the annular outer compartment 4, so that it is no longer necessary to provide an air-flow booster 25 in the return line 24.

This construction is preferably operated in such a manner that, after a sufficient amount of particulates has moved into the chamber 13, air is ejected by the nozzles into the chamber 13 after the opening(s) 12 has/have been closed. As long as the opening(s) 12 is/are open, the particulates dropping from the outer side of the filter cartridge 3 move into the particulates-collection chamber 13 and after a specific time, the opening(s) 12 is/are then closed and the particulates in the chamber 13 are swirled up by injecting air and therefore particulates accumulations are swirled up. The particulates-collection chamber 13 therefore alternately operates with the opening 12 or slots 12 open to receive particulates from the annular outer compartment 4 (these particulates are produced in particular when compressed air nozzles 10 blow from the inside to the outside through the filter cartridge 3, to blow off the particulates accumulated on the filter cartridge), and to then force air into the chamber 13 with the slots 12 closed, so that the particulates then move via the particulates conduit 17 to the separator 18.

The invention claimed is:

1. An apparatus for filtering particulates from air, the apparatus comprising:
   a housing;
   at least one filter cartridge in the housing and defining therein a filter chamber;
   a vertical and cylindrical filter wall in the housing and defining an inner cartridge compartment and an outer unfiltered air compartment;
   means for blowing particulate-laden air into the outer compartment from outside against an outer surface of the filter wall so that the particulates accumulate on the outer surface of the filter wall;
   compressed air nozzles in the inner cartridge compartment that blow the accumulated particulates outward off the filter wall outer surface so that the blown-off particulates move downward in the outer compartment into at least one particulates-collection chamber therebelow;
   a particle/gas separator;
   a particulates conduit for transporting air and the particulates from the particulates-collection chamber to the separator that frees the air of the particulates;
   a return line extending from the separator to the particulates-collection chamber or to the outer compartment of the filter chamber such that air essentially freed of the particulates returns to the particulates-collection chamber or to the outer compartment of the filter chamber;
   structure forming in the particulates-collection chamber at least one annular or partially circular closable opening to the outer compartment of the filter chamber;
   a seal in the housing and inflatable to close the opening.

2. The apparatus according to claim 1, further comprising:
   blowing nozzles that open tangentially into the particulates-collection chamber, such that air contained in the particulates-collection chamber is swirled up together with the particulates collected therein by air injected through the blowing nozzles, to be transported away through the particulates conduit.

3. The apparatus according to claim 2, further comprising:
   means for moving the particulates from the particulates-collection chamber through the particulates conduit into the separator by blowing air into the particulates-collection chamber.

4. The apparatus according to claim 1, further comprising:
   a particulates container connected in a removable and replaceable manner to the separator.

5. The apparatus according to claim 1, further comprising:
   an air-flow booster in the return line.

6. The apparatus according to claim 4, further comprising:
   a closable intake port between the particulates container and the separator; and
   means for automatically closing the intake port of the particulates container after removal of the particulates container from the separator.

7. The apparatus according to claim 1, wherein the separator is a cyclone separator at a downstream end of the particulates conduit.

8. The apparatus according to claim 4, wherein the particulates container has a film or membrane on its upper side through which passes a lower particulates discharge tube of the separator.

9. The apparatus according to claim 8, wherein a floor of the separator forms a funnel that opens into the particulates discharge tube.

10. The apparatus according to claim 4, wherein the particulates container has a tubular outer wall made of a low-cost material such as cardboard, paper, or plastic.

11. The apparatus according to claim 4, further comprising:
    a fill level sensor outside on the particulates container.

12. The apparatus according to claim 1, further comprising:
    means for rotating the particulate-laden air in the outer compartment above the filter cartridge by a tangential supply and/or by a rotation generator having an inclined vane so that the particulate-laden air circulates in the outer compartment around the filter cartridge in a spiral.

13. The apparatus according to claim 1, wherein the housing is portable and contains the filter cartridge, the particulates-collection chamber, and an intake fan that are arranged one above the other.

14. The apparatus according to claim 4, wherein the separator and the particulates container are fastened as a replaceable cartridge on a rear of the housing.

* * * * *